US005509073A

United States Patent [19]

Monnin

[11] Patent Number: 5,509,073
[45] Date of Patent: Apr. 16, 1996

[54] COMMUNICATIONS NETWORK

[75] Inventor: Gerard Monnin, Paris, France

[73] Assignee: Schlumberger Industries, Montrouge, France

[21] Appl. No.: 157,720

[22] Filed: Nov. 26, 1993

[30] Foreign Application Priority Data

Nov. 26, 1992 [FR] France ................................. 92 14358

[51] Int. Cl.$^6$ .............................. H04N 7/167; H04K 1/00
[52] U.S. Cl. .................................. 380/20; 380/16; 380/23
[58] Field of Search .................................. 380/16, 20, 23

[56] References Cited

U.S. PATENT DOCUMENTS

| 4,751,732 | 6/1988 | Kamitake | 380/20 |
| 4,905,280 | 2/1990 | Wiedemer et al. | 380/16 |
| 5,144,663 | 9/1992 | Kudelski et al. | 380/16 |

OTHER PUBLICATIONS

Funkschau—vol. 61, No. 5, Feb. 24, 1989, Germany, pp. 59–62 XP000011447; C. Schepers "Eurocript—Der Schlüssel Zum Scrambling-Problem?".
Elektronik—vol. 38, No. 6, Mar. 17, 1989, Germany pp. 56–58 XP000039410; M. Jünke "Digitales Fernsehkonzept Für Satelliten-Pay-TV".
Cable Tech & Services—Jan. 30, 1993 (pp. 5 & 12); "Smartcrypt sur le terrain de Visiopass et Syster".
Satellite Trader—Mar. 1993: "Prospect of pirate-proof PPV".
La Lettre de la Videocommunication par Cable No. 68; Apr. 5, 1993, pp. 1, 8, 9, 10.
Cable & Satellite Express, vol. 10, No. 12, Jun. 10, 1993: J. Alliot, "RCF chooses Smartcrypt".
Cable & Satellite Europe, Aug. 1993: "Innovations–Very Smart Card".
Card Technology Today, vol. 4, No. 7, Mar. 1993.
Advanced Television Markets, Issue 13, Feb. 1993: G. Morgan, "Smartcrypt steps up".
Cable Tech & Services, May 21, 1993; "Chaines Cinèma: dècryptage, un an aprés".
INF Cable, No. 394, May 21, 1993, "Sous le Projecteur", pp. 1 & 4.
IEEE Transactions on Consumer Electronics–vol. 37, No. 3, Aug. 1991, New York, pp. 432–436 XP0000263219; V. Lenoir "Euroscript, A Successful Conditional Access System".

Primary Examiner—Stephen C. Buczinski
Attorney, Agent, or Firm—Frishauf, Holtz, Gootman, Langer & Chick

[57] ABSTRACT

A communications network between a central station which broadcasts coded information and at least one receiver suitable for receiving and decoding these broadcasts, in which, in order to control the number of users, permission for users to access the network is determined by a limited number of special receivers respectively assigned to such users and also by the need to authenticate each user before granting access to the program by his receiver. In order to facilitate identification of the user and authentication of his access rights to a particular program, the receiver allows remote authentication, and also local authentication with a memory card in which information related to certain access rights is stored.

9 Claims, 3 Drawing Sheets

COMMUNICATIONS NETWORK

FIELD OF THE INVENTION

The present invention relates to a communications network between a station which broadcasts coded program signals and at least one receiver suitable for receiving and decoding the broadcast signals, such as for display on a television set.

More precisely, the invention relates to a communications network in which access to the broadcast programs is controlled, the network having at least one receiver provided with circuitry which controls internal operations and connection to the broadcasting station, and in particular which verifies whether a user has access rights to a program and, if so, receives and decodes the program signal. The word "connection" is used herein to describe not only a wired connection, such as for cable systems, but also for wireless systems in the sense that a connection is made when the emitted (i.e. broadcast) signal is detected and decoded. The terms coding/decoding are used herein synonymously with scrambling/unscrambling and encryption/decryptions.

Another way of describing the invention is that it relates to a communications network in which, in order to control the number of users, the users must have one of a limited number of special receivers, and access rights must be authenticated before activating a receiver for a particular program.

BACKGROUND OF THE INVENTION

Such network systems for television are commonly known as "PAY-TV" networks. In such a system an administering company manages the network. It controls distribution of special receivers to only those users who pay a participation fee for obtaining access rights to the network. The special receiver is of the type which is able to receive and decode the desired programs. A user who stops paying will be excluded from the network by disconnection or by removal of the receiver.

However, there have been problems with dishonesty in such networks. For example, some people have removed a receiver, "reverse engineered" it and finally copied it so as to avoid paying the administering company.

In response to this, so as to avoid or hinder copying of their receivers, the companies have provided their receivers with very unusual components specially developed for very sophisticated methods of coding/decoding broadcast signals. As these sophisticated and expensive receivers are not cheap, a large number of old receivers have still not been replaced. With such a system, despite numerous efforts to control the number of authorized users of such networks, a large number of clandestine users are known to exist already and it is estimated that this number will increase.

SUMMARY OF THE INVENTION

One aim of the present invention is to remedy these disadvantages by restricting access to a communications network only to those customers, or users, who are authorized to participate in that network.

Moreover, certain companies now use a system, different from the one described above, for identifying the user and remotely authenticating access rights. In such networks, a user requests, for example by telephone, the right to access a network for at least one program or for one time period of access, for example. If access is granted, the administering company identifies the receiver belonging to that user, verifies the information relating to access rights and to the decoding information stored in a memory device installed in the receiver, and then allows the user to activate the receiver. (More details of this system are provided below.)

These operations which involve a telephoned request from the user followed by the granting of permission for access rights by the company are inconvenient for both of these parties because, in networks with a large number of users, several simultaneous calls could lead to long delays in authenticating access rights which can result in dissatisfied users and cause overloaded telephone lines.

Another aim of the invention is to avoid these disadvantages for the users and to facilitate the task of authenticating access rights.

To achieve these aims, a network of this type according to the invention is provided with a receiver which comprises a card reader incorporated in the receiver, the card reader being suitable for receiving and reading a memory card containing information relating to the access rights of the user. Moreover, the company administering the network can sell memory cards (in the same way as telephone cards, for example) to users. The memory cards contain specific access permissions (referred to herein as entitlement data), such as information (data) about the prepaid period of use (e.g. special dates or duration of time), special access to a specified program or all programs of a certain kind (e.g. sports shows) for the next two months, etc.

In a preferred embodiment of the invention, the information in such a memory card inserted in the reader of a receiver makes it possible to avoid telephoning the administrating company which no longer has to address the receiver in order to provide access rights to the receiver. Use of the memory card is sufficient for this purpose, and access to the program is gained more easily, quickly and efficiently.

In this case, the information contained in the inserted memory card is read and copied from the memory card into the receiver memory where it is added to the access authorization information related to the transmissions of the broadcasting station. The receiver memory can be, for example, a smart card with a microchip memory. Such a receiver as described above and equipped with a smart card also includes general electronic circuitry which controls all operations inside the receiver and produces output signals, a reader (or connector) for the smart card and the smart card itself.

The authorization information stored in the memory of the smart card is related, for example, to the identification number of the particular receiver, to the encryption/decryption keys and algorithms of the transmissions, to special definitions for groups of channels, and the like. This authorization information could be updated remotely from the broadcasting station by the administering company. It is important to understand that the receiver with its smart card is the highest priority to control the functioning of the receiver. Without the smart card, the receiver cannot work, not even with an inserted memory card. A known drawback of existing receivers is that when the administering company changes encryption/decryption keys, the receivers must be replaced. This is no longer the case with the above-described receiver in that change or replacement of receivers is not necessary, but only a replacement of the smart card. Once a user inserts a memory card, the information contained in the memory card will be copied and recorded in the memory of the smart card of the receiver, and it will then be deleted from (or invalidated) the memory card. In other words, the access-right-defining information in the memory card which is concerned with access for a particular program or for a group of programs, access for a predetermined period, or access for a combination of these various rights, is consumable and, as with telephone cards, is normally not renewable or reusable.

It should be repeated that the receiver according to the invention functions equally well with or without such a memory card. The administering company can still communicate authorization signals remotely to each receiver for which the owner has prepaid his access in a different way than by buying such a memory card. It is, therefore, the user who determines whether the receiver will be activated via remote authorization from the broadcasting station by the administering company, or by utilization of a memory card.

One advantage of this arrangement is that the likelihood of someone making unauthorized copies of such memory cards is minimal. This is because it is not worth the effort to make a fraudulent copy of such a memory card because the information in the memory card can be very precisely defined in relation to the period and/or the program for which the information is valid. Given that such memory cards will no longer be considered valid after being read by the reader of the receiver, or after the particular date of the program, copies of such cards have very limited usefulness.

DETAILED DESCRIPTION OF THE INVENTION

Figure 1:
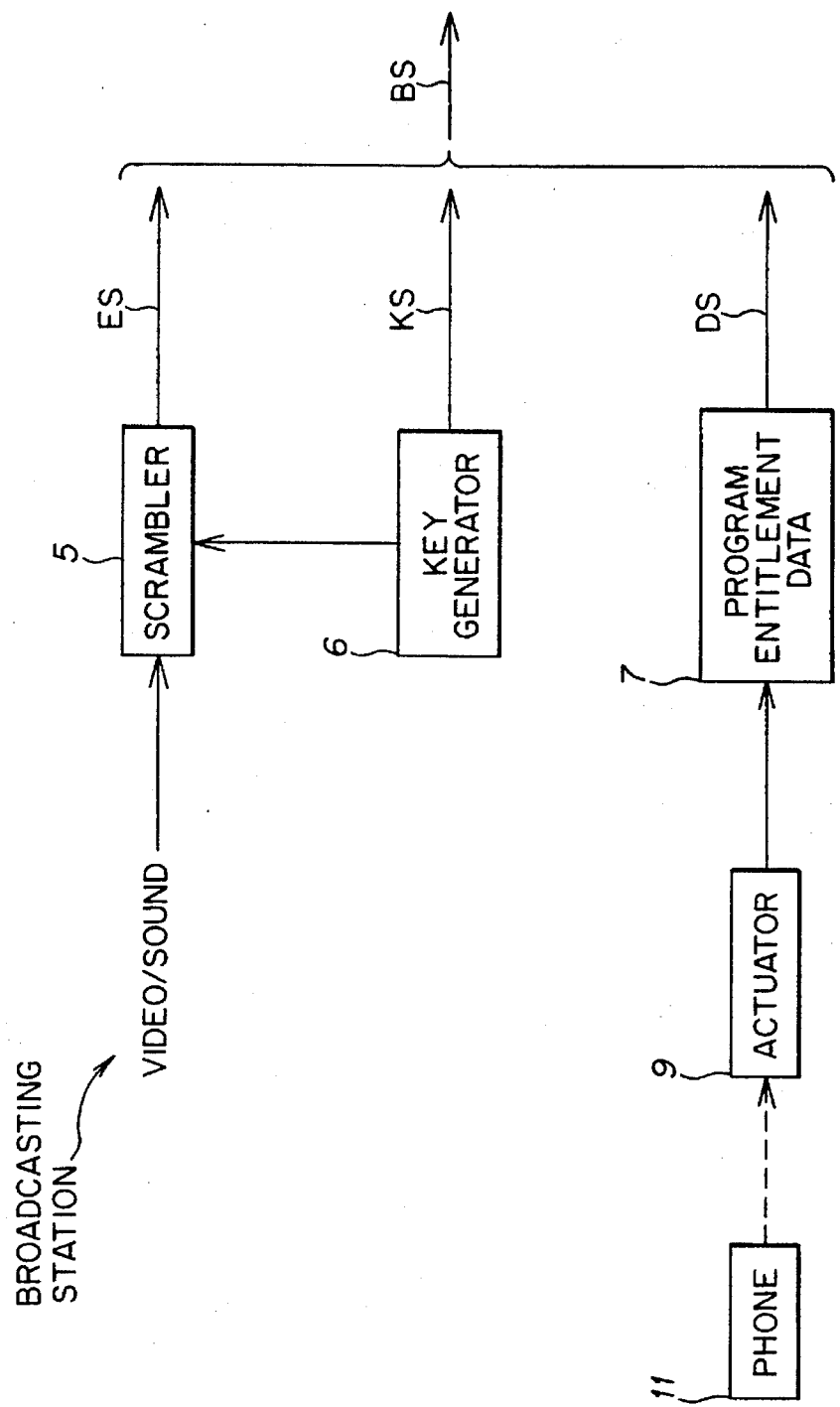
FIG. 1 shows a prior art network and, in particular, the broadcasting station.

FIG. 1 shows that a broadcasting station of the above-described known system includes a scrambler 5 for encrypting the video and sound signals of a program. The encrypted signal ES is then utilized in producing broadcast signal BS. The key(s) for encryption of the video and sound signals are provided by key generator 6. These keys are utilized by scrambler 5 and, likewise, are required by descrambler 19 (discussed below). Output signal KS of key generator 6 also constitutes part of signal BS.

Circuit 7 of the broadcasting station generates program entitlement data concerning the cost, duration and identification of a particular program or set of programs, or of an allowed viewing period, for example. This data is generated by circuit 7 as signal DS under the control of an actuator 9 which is shown as being associated with a telephone 11. As explained above, in order to gain access to a program, the user telephones the administering company which identifies him as an authorized user as well as verifies that the appropriate fee has been paid and, if so, actuator 9 causes signal DS to be produced and broadcast. Actuator 9 can be manual in the sense that it is operated by an employee of the administering company, and it can also be automated so as to be operated by the user with just a telephone keypad much like the voice mail systems of today which can route a telephone call, for example.

Signals ES, KS and DS are shown in FIG. 1 as being combined to constitute signal BS. Of course, signal ES is continually broadcast during the duration of a program and a broadcast period, whereas signal DS is normally necessary just at the time when access to a program is being sought. In case the administering company decides to change the encryption/decryption keys remotely, key signal KS is added to the signals ES and DS as and when needed, such as for a duration and in a manner sufficient to transfer such data to the receiver. Also, signal DS and/or signal KS can likewise be transmitted by means other than as a part of signal BS in that another modulation technique or transmission medium, for example, can be used than that of signal BS.

Figure 2:
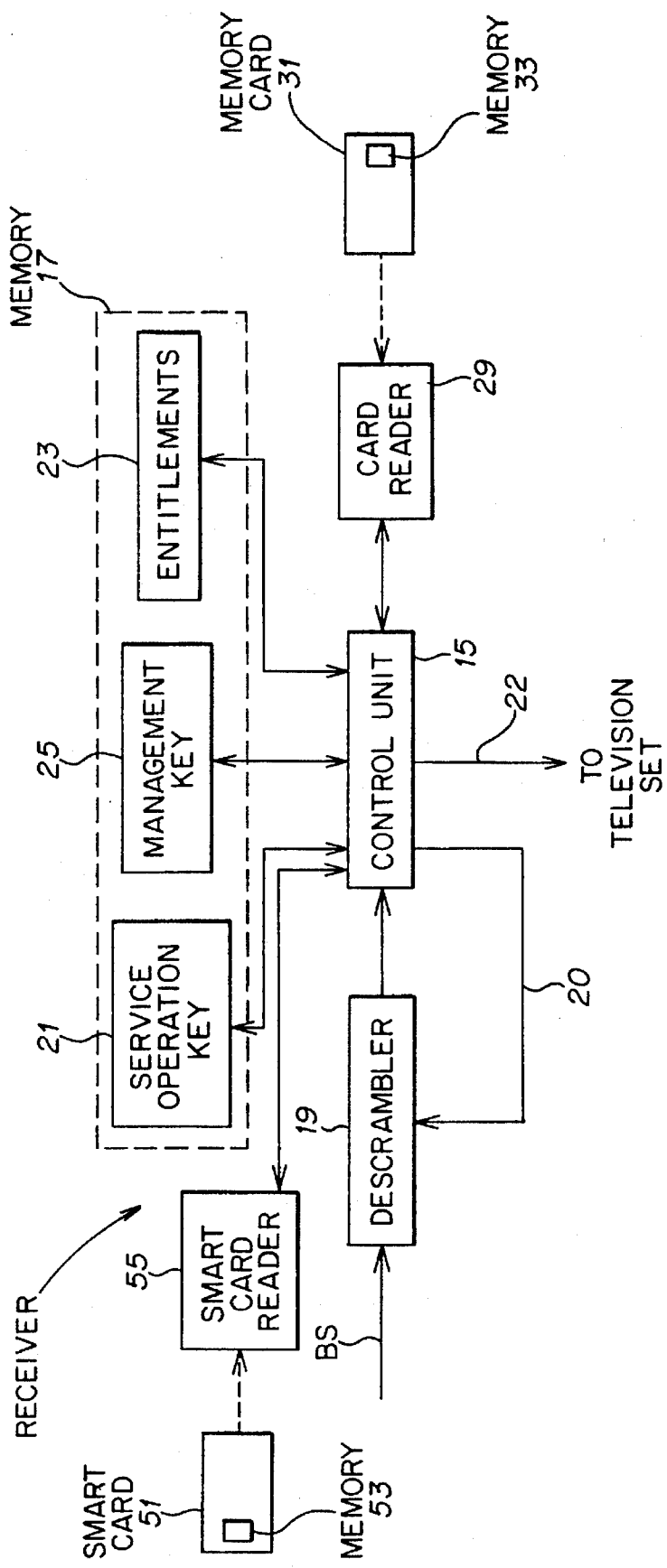
FIG. 2 shows a receiver in accordance with the present invention for use with the broadcasting station of FIG. 1.

FIG. 2 shows a receiver for use with the broadcasting station of FIG. 1. FIG. 2 is a modified version of a receiver which is used in the above-described known network system. Thus, the known elements of the receiver will be described first, and then the enhancements made to it in accordance with the present invention will be explained.

The receiver includes a control unit 15, a memory 17 and a descrambler 19. Broadcast signal BS includes a control portion and a program portion. Descrambler 19 filters the signal BS to pass the control portion to the control unit 15. Control unit 15 receives the control portion of broadcast signal BS from the broadcasting station, performs certain security-related tasks (described below) to verify that access to the particular user is allowed and to update certain information in memory 17, and if allowance of such access is verified, control unit 15 enables descrambler 19 (via line 20) to decrypt the program portion of signal BS and, thus, to provide the program (via output line 22) to a television set (not shown) for viewing.

Memory 17 stores the information which is required to control access to programs. More specifically, a portion 21 of memory 17 stores a service operation key which deciphers a control word in signal ES. A control word is used to synchronize the scrambling/descrambling process. The service operation key, and associated algorithms stored with it, provide the primary level of security in the sense that the receiver cannot operate unless the control word is properly deciphered.

A portion 23 of memory 17 stores entitlements data which identify the time, duration, and title of a program or programs to which the user is permitted to have access. This information is obtained from the broadcasting station under control of a management key stored in portion 25 of memory 17. Thus, the entitlement data may identify one program for immediate viewing, or it can identify a "soap opera" broadcast at the same time every day for one week, or any group of specified programs.

When the BS signal is received, it is processed by control unit 15 to decipher the control word, and the particular program about to be or being broadcast is checked against the entitlements. Of course, if entitlement data is being received, due to a previously placed telephone call by the user, such information is routed to memory 17, as indicated by the dual headed arrow to entitlements memory portion 23.

Memory 17 can be hardwired into the receiver. Preferably, however, it is a smart card 51. Such a card is typically the size of a credit card and includes a form of memory 53, such as a memory chip, into which data can be written and from which data can be read. In such a case, it is understood, of course, that incorporated into the receiver is a smart card reader 55 of conventional design (not shown).

The above-described arrangement of a broadcasting station and receiver is used in Europe under the mark EURO-CRYPT, and details thereof are provided by the article "EUROCRYPT, A SUCCESSFUL CONDITIONAL ACCESS SYSTEM" in IEEE Transactions on Consumer Electronics, Vol. 37, No. 3, Aug. 1991, pages 432–436. Therefore, only a summary of this known system, as provided herein in connection with FIGS. 1 and 2, is deemed necessary.

The description of the known network system has now been completed. An explanation of the enhancements thereto contributed by the present invention will now be explained.

The receiver is also provided with a reader 29 for a memory card 31 which has a memory 33. Memory 33 can simply be a magnetic stripe, but it can also be a chip. Generally, such a card 31 stores units which are valid as payment for activating the receiver. This type of card 31 is similar to prepaid telephone cards and gives the user of such a receiver access rights in terms of a usable time period, for example, which the user has paid for. Also, prepaid cards related to special sport event shows which will be transmitted by the network are imaginable. In such a case, the units on the card 31 pay for the entire event rather than for predetermined periods of time.

Once a valid card 31 is inserted into reader 29, the data of the memory 33 will be copied and added (stored) to the data already contained in the memory 17 of the smart card, and such data (e.g. units) will be deleted afterwards from the memory 33 of the card 31. The type of memory 33 is not significant as long as it suffices to enable data to be stored as consumable units and to identify the data as no longer valid after it has been consumed.

Operation of such a network according to the invention can be described as follows:

Having decided to receive one or more broadcast programs and being in possession of a receiver, a user has the following two options for activating said receiver:

(a) contacting, for example by a telephone call, the administering company so as to ask for permission to access and for the rights to receive the chosen program(s), or (b) inserting a card 31 with a memory 33 in the reader 29 of the receiver.

In case (a), the administering company verifies the access rights requested by the user, and if the company confirms the authenticity of these rights, it addresses the receiver and broadcasts permission to it, this permission comprising access rights and modes of utilization of the receiver. When the data is received by the receiver and stored in its memory 17, the receiver has permission to operate. The simplest way already known is that the company checks within its files whether the user of a particular receiver with a particular identification number has already paid for a coming period of time. In case the user has paid, the broadcasting station sends out a signal that permits access and the authorization for the prepaid period (only) to that receiver with the particular identification number. This mode of operation is the one utilized in the above-mentioned EUROCRYPT system.

In case (b), the procedure for using the receiver is simpler than in case (a) because the sequence of contacting the company and of waiting for authentication is replaced by the simple operation of the user inserting a memory card 31 which already contains all authorizations for access rights in its memory 33. By copying this information from the memory 33 of the card 31 into the memory 17, which is initiated and controlled by the control unit 15, the receiver is activated and ready for usage in unscrambling signal BS with descrambler 19.

The completed data set in the memory 17 of the smart card of the receiver then contains all needed data for decryption and authorization. The data originally stored in memory 33 of the memory card 31 is then considered as being depleted or no longer valid.

Figure 3:
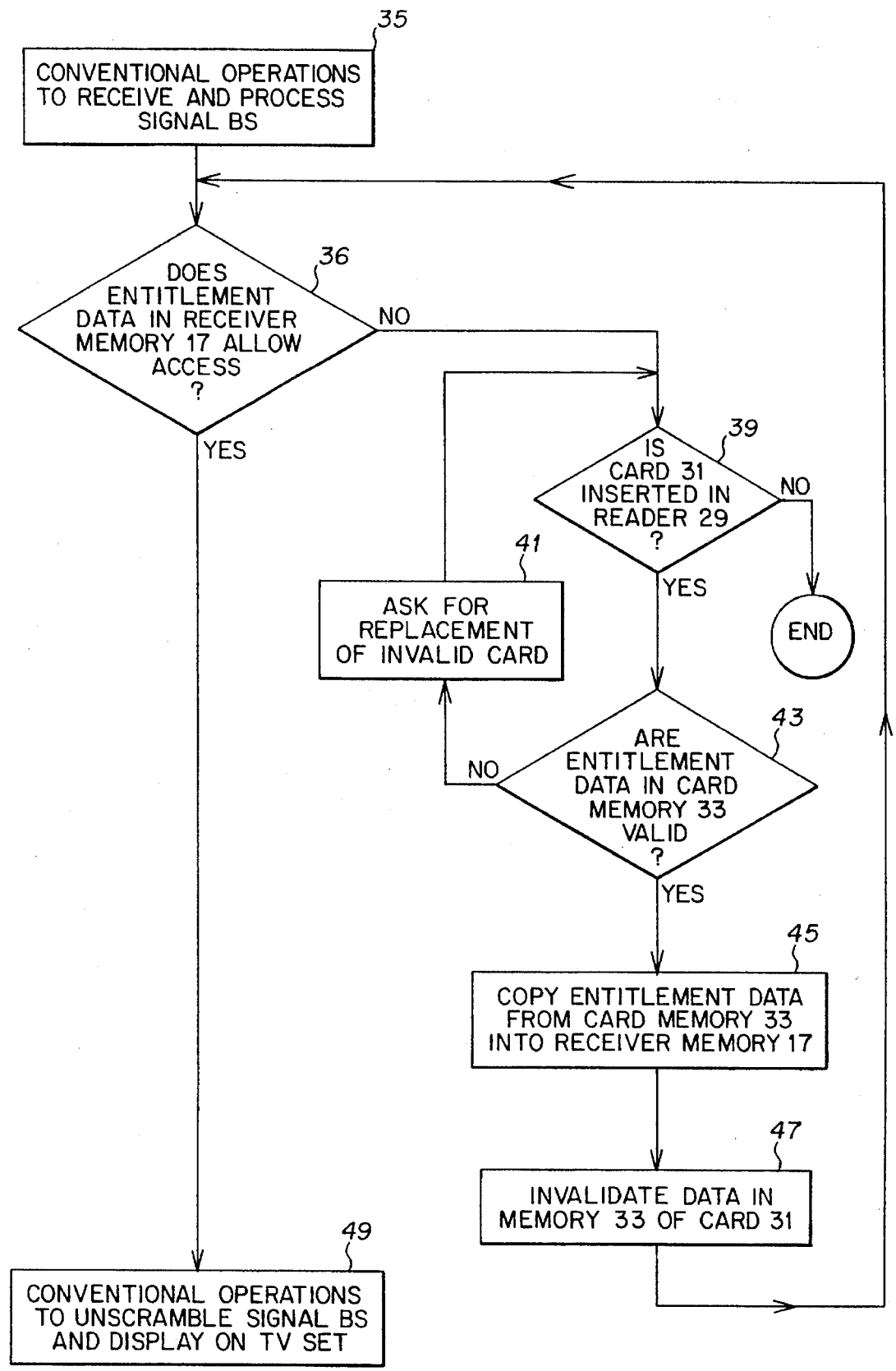
FIG. 3 is a flowchart for performing the present invention.

FIG. 3 is a flowchart of steps used for carrying out the invention with the receiver of FIG. 2. After a user has switched on his receiver, step 35 represents a group of the operations which are conventionally carried out by the above-described EUROCRYPT type of receiver when a BS signal is received. In step 36, the receiver verifies whether the entitlement data stored in memory 17 allows the user access to the broadcast signal BS then being received. If the requisite entitlement data is not found in memory 17, step 39 checks whether a memory card has been inserted into card reader 29. If not, then receiver operations are terminated after a predetermined number of repetitions of steps 36 and 39 to await receipt of authorization following a telephone call by the user to the company, i.e. case (a) described above, or insertion of a memory card, i.e. case (b) described above.

If an inserted smart card is detected, step 43 determines whether the entitlement data in memory 33 is valid in terms, for example, of its date not having passed and that it still has consumable units remaining. If not, the receiver asks per step 41 for insertion of another, valid memory card, and then returns to step 39. If the entitlement data in memory 33 is valid, step 45 reads the data, copies it from memory 33 of card 31 and stores it in memory 17. Step 47 then invalidates the data in card 31 so that it cannot be used again, as is commensurate with its being a consumable amount of units, for example. Step 49 represents the above-described group of known operations in the EUROCRYPT system to unscramble the signal BS for a program authorized for viewing, and its display on the television set associated with the receiver.

Although a preferred embodiment of the invention has been described above, various modifications thereto will be readily apparent. For example, if memory 17 is a smart card, and if the administering company wants to change the algorithms and/or techniques used for security operations, as for example scrambling/descrambling, only the smart card containing all this data needs to be replaced by a new one. It is no longer necessary to replace an entire receiver, as in the past. Also, although the present invention has been described above as an enhancement of the EUROCRYPT system, it can likewise be of value as primarily an alternative way to pay for entitlements in place of, for example, making payments by mail or telephone. Thus, the payments would be made by purchasing a memory card which would then be used in the manner described above for obtaining access to a program. These and all other such modifications are intended to fall within the scope of the present invention as defined by the following claims.

I claim:

1. A receiver for a communications network, including a station which broadcasts coded program signals, said receiver being assigned to each user subscribing to such communications network for receiving and decoding the broadcast signals, the receiver comprising:

means for authenticating access rights of the user to a program being broadcast by the station and having a control unit and a memory for storing a decoding key and information relating to access rights to which such user is entitled;

means for receiving and decoding the broadcast signals to a program for which access rights have been authenticated by said authenticating means;

a memory card reader having means for reading a memory card containing access rights information;

wherein said authenticating means determines the access rights of the user based on information in said memory and said memory card; and means for copying and storing said access rights information from said memory card to said memory of said authenticating means.

2. The receiver according to claim 1, wherein said authenticating means, each time the user inserts a memory card in the memory card reader of the receiver, authenticates the access rights of the user by comparing the information relating to the access rights in said memory of said authenticating means and said memory card.

3. The receiver according to claim 1, further comprising control means for effecting a modification of the information in at least one of said memory of said authenticating means and said memory card.

4. The receiver according to claim 3, wherein said control means modifies the information in said memory of said authenticating means as a function of the information in said memory card.

5. The receiver according to claim 3, wherein said control means invalidates the information in the memory card after such information is used to modify the information in said memory of said authenticating means.

6. The receiver according to claim 1, wherein said memory of said authenticating means is a memory element of a smart card, said receiver further comprising a smart card reader.

7. The receiver according to claim 6, wherein said memory element of a smart card is a memory chip.

8. The receiver according to claim 6, wherein said smart card stores security-related data for verifying that access by the user is allowed and entitlement data to control access by the user to a particular program, whereas said memory card stores only said entitlement data.

9. The receiver according to claim 8, wherein said means for copying and storing updates said entitlement data stored in said smart card with said entitlement data stored in said memory card.

\* \* \* \* \*